United States Patent Office 3,226,441
Patented Dec. 28, 1965

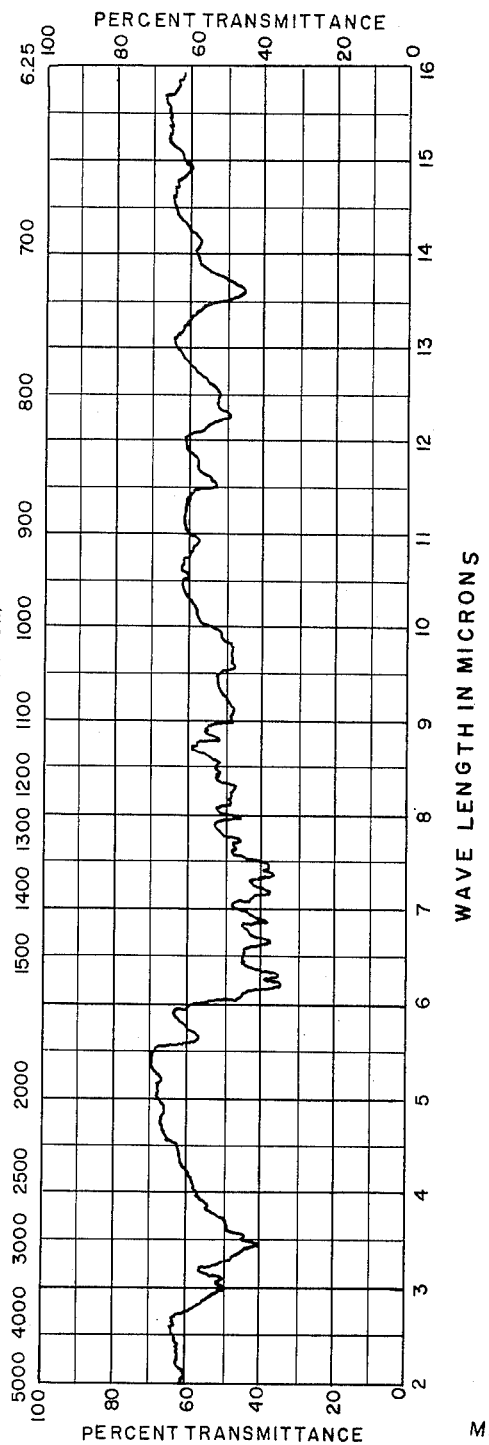

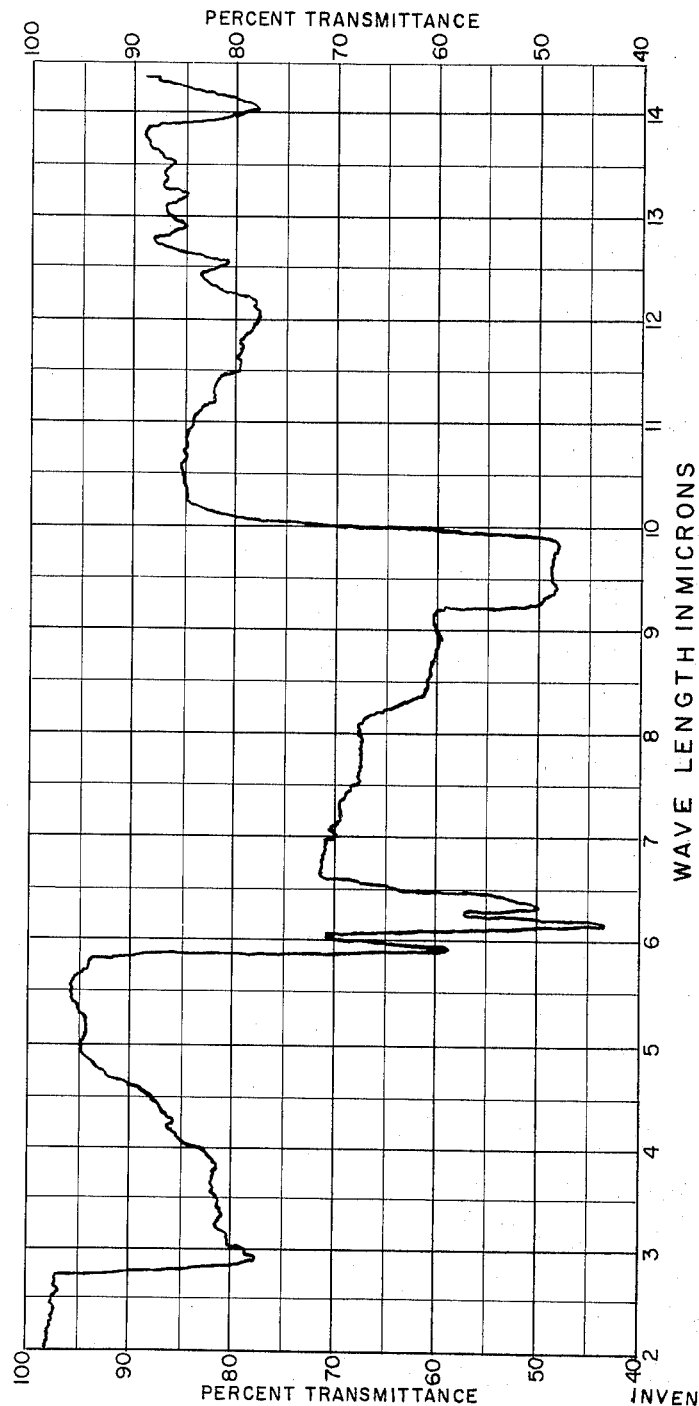

3,226,441
2-DECARBOXAMIDO-2-ACETYL-TETRACYCLINE DERIVATIVES AND PROCESS
Max W. Miller, North Stonington, Conn., assignor to Chas. Pfizer & Co., Inc., Brooklyn, N.Y., a corporation of Delaware
Filed July 28, 1961, Ser. No. 127,593
The portion of the term of the patent subsequent to Feb. 20, 1979, has been disclaimed and dedicated to the Public
9 Claims. (Cl. 260—571)

This is a continuation-in-part of application Serial No. 17,851, filed March 28, 1960, now U.S. Patent No. 3,022,347.

This invention is concerned with new and useful antimicrobial agents, as crude concentrates and in purified form, and with fermentation processes for their production. More particularly it is concerned with novel tetracycline antibiotics, with methods for their production by mutated species of *Streptomyces aureofaciens*, and with methods for the recovery, concentration and purification of these antibiotics from crude solutions, including fermentation broths.

The new antibiotics are amphoteric substances of the following formula:

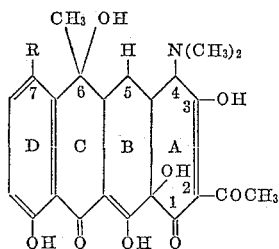

where R may be either hydrogen or chlorine. These are tetracycline antibiotics possessing in the 2-position an acetyl group in place of a carboxamido group. Accordingly, the substance corresponding to R=H is designated 2-acetyl - 2 - decarboxamidotetracycline, and that corresponding to R=chlorine is 2-acetyl-2-decarboxamido-7-chlortetracycline.

The new antibiotics are formed during the cultivation under controlled conditions of certain mutants of *Streptomyces aureofaciens*. A living culture of one such mutant, classified by planting and testing cultures thereof on media normally used for the identification of such microorganisms and by observing the growth and/or changes which occur incident thereto, has been deposited with the American Type Culture Collection in Washington, D.C. as ATCC No. 13749. Mutants of *S. aureofaciens* are prepared by well known procedures such as treatment of *S. aureofaciens* Duggar with X-radiation, ultraviolet radiation, nitrogen mustards and the like.

In copending application Serial No. 17,851, 2-acetyl-2-decarboxamidooxytetracycline was disclosed, together with a process for its production by cultivation of *Streptomyces rimosus* mutants. That application further disclosed that partially purified concentrates of 2-acetyl-2-decarboxamidooxytetracycline are found to contain a second substance, designated Component 2, and evidence was presented indicating the identity of Component 2 with 2-acetyl-2-decarboxamidotetracycline. This apparent identity has not, however, been supported by further investigation, and the only organisms now known to produce 2-acetyl-decarboxamidotetracycline are the aforesaid *S. Aureofaciens* mutants. Thus, 2-acetyl-2-decarboxamidotetracycline and the corresponding 7 - chloro compound differ distinctly from 2-acetyl - 2 - decarboxamidooxytetracycline, being obtained by an entirely different process. The two antibiotics of the present invention are produced by *S. aureofaciens* mutants, but are not detected in the fermentation products of *S. rimosus* mutants. Conversely, 2-acetyl-2-decarboxamidooxytetracycline is produced by *S. rimosus* mutants but cannot be detected in the products of *S. aureofaciens* fermentations.

The new antibiotics of the present invention share with oxytetracycline and other antibiotics produced by Streptomyces the property of having a wide antibiotic spectrum, particularly among the gram negative bacteria. Table I illustrates the activity of 2-acetyl-2-decarboxamidotetracycline against a group of microorganisms which cause various diseases. The tests are carried out by the serial dilution technique. According to this procedure a nutrient medium is prepared containing the antibotic at a concentration of 100 mcg./ml. Aliquots of this medium are next diluted with varied volumes of water so that tubes containing the antibiotic at a concentration of 100, 50, 25, 12.5, 6.25, 312, 1.56, 0.78, 0.39 and 0.19 mcg./ml. are obained. These tubes are then inoculated with the test organism and incubated to determine the extent to which the microorganism grows in the presence of antibacterial agent. In this fashion, the minimum inhibitory concentrations of 2-acetyl-2-decarboxamidotetracycline are determined. These are recorded, together with the antimicrobial activity of tetracycline and of 2-acetyl-2-decarboxamidooxytetracycline, in the following table.

TABLE I

| Microorganisms | 2-acetyl-2-decarboxamido-tetracycline MIC (mcg./ml.) | 2-acetyl-2-decarboxamide oxytetracycline | Tetracycline |
|---|---|---|---|
| *Streptococcus pyogenes* | 0.78 | 6.25 | .019 |
| *Corynebacterium diphtheriae* | 6.25 | (pi) 25 | 312 |
| *Bacillus subtilis* | 0.78 | (pi) 1.56 | .08 |
| *Neisseria gonorrhoeae* | 3.12 | 25 | 0.2 |
| *Brucella bronchiseptica* | 12.5 | 50 | 0.4 |
| *Micrococcus pyogenes var. aureus* | 3.12 | (pi) 6.25 | .019 |
| *Streptococcus agalactiae* | 3.12 | 1.56 | 0.16 |
| *Mycobacterium 607* | 3.12 | 3.12 | |
| *Malcomyces mallei* | 100 | 200 | 3.6 |
| *Shigella sonnei* | 50 | 50 | 0.39 |
| *Hemophilus influenzae* | 1.56 | 6.25 | 0.03 |
| *Proteus vulgaris* | >100 | 100 | 100 |
| *Streptococcus faecalis* | 6.25 | 6.25 | 0.312 |
| *Diplococcus pneumoniae* | 6.25 | 12.5 | 2.0 |
| *Erysipelothrix rhusiopathiae* | 12.5 | 12.5 | 0.31 |
| *Listeria monocytogenes* | 12.5 | 25 | 0.78 |

(pi)=partial inhibition.

This invention embraces processes for growing the new mutants of *S. aureofaciens*, preferably at 24–30° C. under submerged conditions of agitation and aeration, in media preferably at an initial pH of about 6 to 7 and containing a carbohydrate source, such as sugars, starch, and glycerol; and organic nitrogen source, such as corn steep liquor, soybean meal, wheat gluten, cottonseed meal, lactalbumin, enzymatic casein digest, and tryptone; a source of growth substances, such as distillers solubles and yeast extract; mineral salts, such as sodium chloride, potassium phosphate, magnesium sulphate, sodium nitrate; a buffering agent, such as calcium carbonate; trace metals like iron, manganese, cobalt and zinc; and vegetable oil. After growth has been completed, the mycelium is separated from the broth now containing the antibiotic, and the latter is recovered from the broth by means of extraction with organic solvents at a suitable pH, or by adsorption onto activated carbon followed by elution with organic solvents or water at suitable pH, or by other means well known to the art. The new antibiotics possess unique and valuable properties which distinguish them from all known and previously described antibiotics.

Inoculum may be obtained by employing a growth from slants or Roux bottles inoculated with the desired mutant. Solid media suitable for this initial growth are beef lactose or Emerson's agar. This growth is used to inoculate either shaken flasks or submerged inoculum tanks; or alternatively, the inoculum tanks are inoculated from the shaken flasks. Any shaken flask growth will generally have reached its maximum in four days, whereas inoculum in submerged inoculum tanks will usually be at the fost favorable period in two days. From the inoculum tank the broth containing the microorganism is forced into the fermenter under completely aseptic conditions, and growth is continued for a further period of from two to five days. At all times aeration is maintained in the tanks by blowing in sterile air through a sparger at the rate of ¼ to 2 volumes of free air per volume of broth per minute. If difficulty is experienced in preventing the rise of the foam within the tank, antifoaming agents, such as silicone or vegetable or animal oils may be added. When the period for fermentation has elapsed, the broth is filtered, suitably at acidic pH, to remove the mycelium.

2 - acetyl-2-decarboxamidotetracycline and 2-acetyl-2-decarboxamido-7-chlortetracycline are often coproduced, the latter in smaller quantities. They may be recovered in admixture from their filtered fermentation broths by a variety of procedures. For example, mixtures of the new antibiotics may be isolated by extraction from the fermentation broth into an organic solvent, or by adsorption onto activated carbon followed by elution. Extration with a solvent such as butanol or methyl isobutyl ketone is most efficiently conducted at a pH above 8 or below 4, preferably at a pH of about 8 to 9 or 2 to 4. However, is is also possible to extract the antibiotics successfully at the intermediate pH values near or at neutrality. About one volume of solvent per volume of broth is appropriate, and this may be suitably employed in divided portions in a series of batchwise extractions, or in countercurrent extraction by podbielniak machine.

Further purification is achieved by a variety of procedures. For example, the solvent extract may be concentrated and the antibiotic content precipitated by addition of a non-solvent such as ether. Alternatively, the concentrated extract is thoroughly reextracted into aqueous hydrochloric acid and, after treatment with activated carbon, the combined aqueous layers are neutralized to precipitate the antibiotics.

The two antibiotics can be separated from each other by taking advantage of the fact that the 7-chloro-substituted compound is less polar. Thus, one may use such techniques as countercurrent distribution between suitable solvent pairs; and fractional crystallization of salts. For example, crystalline preparations of 2-acetyl-2-decarboxamidotetracycline contaminated with the 7-chloro analogue can be purified by crystallization from solvents such as those which have proven useful for the crystallization of oxytetracycline, tetracycline and chlortetracycline; e.g. methanol-calcium chloride-hydrochloric acid for the hydrochlorides, and lower alkanols or water for the free bases.

A particularly useful technique for purification and for separation of the antibiotics is column chromatography on cellulose powder or on diatomaceous earth (celite). Suitable chromatographic solvent systems include 10:1 by volume ethyl acetate:butanol saturated with water adjusted to pH 3 with hydrochloric acid, as well as 40:25:7 by volume ethyl acetate:nitromethane:chloroform saturated with water. Partition chromatography of aqueous acid buffer solutions of the antibiotics may also be conducted on cellulose powder columns against solvent systems such as 20:10:3 by volume nitromethane:chloroform:pyridine. The column effluent is collected in a series of fractions which are assayed, suitably by paper chromatography, and those containing appreciable concentrations of the desired antibiotic are combined to form a product fraction. This solution is then concentrated to precipitate the product. Further purification may be effected by solvent distribution, a second chromatography step, or by recrystallization as previously described.

The ultraviolet absorption spectra of these new antibiotics in methanolic hydrogen chloride and in methanolic sodium hydroxide closely resemble each other:

(1) *2-acetyl-2-decarboxamido-7-chlorotetracycline*
(*crude, crystalline*)

| 0.01 N hydrochloric acid | | 0.01 N sodium hydroxide | |
|---|---|---|---|
| λmax mμ | ε | λmax mμ | ε |
| 230 | 18,870 | 222 | 15,210 |
| 278 | 13,100 | 247s | 13,890 |
| 320s | 7,850 | 276 | 16,750 |
| 339s | 8,120 | | |
| 373 | 10,480 | 389 | 13,210 |

(2) *2-acetyl-2-decarboxamidotetracycline*

| 0.01 N hydrochloric acid | | 0.01 N sodium hydroxide | |
|---|---|---|---|
| λmax mμ | ε | λmax mμ | ε |
| 220 | 16,780 | 235s | 11,050 |
| 277 | 14,990 | 270 | 17,600 |
| 316.5s | 10,870 | | |
| 335s | 11,720 | | |
| 360 | 14,250 | 379 | 16,950 |

The new antibiotics of this invention are further differentiated from 2-acetyl-2-decarboxamidooxytetracycline in that when they are heated in aqueous hydrochloric acid, their ultraviolet absorption spectra are transformed to ones typical of anhydrotetracyclines, demonstrating that they do not contain the 5-hydroxy group which is present in 2-acetyl-2-decarboxamidooxytetracycline; e.g.:

*UV peak wavelengths*

| 2-acetyl-2-decarboxamidotetracycline,[1] mμ | Anhyrdotetracycline, mμ |
|---|---|
| 210 | 224 |
| 273 | 270 |
| 428 | 430 |

[1] After heating a 0.01% solution in 1 N aqueous hydrochloric acid in a boiling water bath for 8 minutes and then diluting to 10 volumes with water.

The new antibiotics, isolated from the *S. aureofaciens* fermentation and purified as described, may readily be distinguished from 2 - acetyl - 2-decarboxamidooxytetracycline as well as from other previously known tetracycline antibiotics, including tetracycline, oxytetracycline, chlortetracycline, 6 - deoxytetracycline, 6-demethyltetracycline, 6-demethylchlortetracycline, and anhydrochlortetracycline by differences in Rf value as determined by paper chromatography with various solvent systems. Their spots on the paper chromatograms are characterized by a strong yellow fluorescence under ultraviolet light and by activity against *K pneumoniae* when the paper is placed in contact with inoculated agar. Paper chromatography of crude isolates from the *S. aureofaciens* fermentation show that both 2-acetyl-2-decarboxamidotetracycline and the corresponding 7-chloro-substituted compound are produced by this fermentation, and separation of these may be achieved as previously described. Approximate Rf values in several solvent systems are given below, together with comparative values for 2-acetyl-2-decarboxamidooxytetracycline. In each case the paper is impregnated with pH 3.5 MacIlvaine buffer.

TABLE II

| Solvent system | Mobile phase (parts by vol.) | Estimated Rf values | | |
|---|---|---|---|---|
| | | 2-acetyl-2-decarbox-amido-tetracy-cline | 2-acetyl-2-decarbox-amido-7-chlortetra-cyclines | 2-acetyl-2-decarbox-amidooxy-tetracy-cline |
| A | Nitromethane (20), Toluene (10), Butanol (5), Pyridine (3) | 0.30 | 0.50 | 0.20 |
| B | Ethyl acetate saturated with water. | 0.05 | 0.20 | 0.1 |
| C | Nitromethane (20), Chloroform (10), Pyridine (3) | 0.25 | 0.50 | 0.15 |

The novel antibiotics of this invention as may be seen from the described data are of great value in the treatment of various infections in humans and animals. They may be administered by parenteral injection, orally or topically in customary dosage forms. For example, they may be used for oral administration in powdered form, as in capsules and tablets or in suspensions in aqueous liquids or edible oils such as sesame oil, peanut oil and the like. Solutions of the antibiotics, as the amphoteric substances or in the form of soluble salts, may be employed for parenteral administration. In addition, the new antibiotics are useful in separating and classifying mixtures of microorganisms for biological research and medical diagnostic purposes.

Hydrogenation of 2-acetyl-2-decarboxamido-7-chlortetracycline converts it to the deschloro analogue. This may be effected, for example, in the following manner: 50 mg. of 10% palladium on charcoal catalyst is suspended in a mixture of 60 ml. methanol and 60 mg. triethylamine and hydrogenated for 23 hours. Then 250 mg. of 2-acetyl-2-decarboxamidotetracycline containing about 50% of the 7-chloro analogue is added (dissolved in a little methanol) and the hydrogenation is continued at 1 atmosphere hydrogen pressure and 30° C. for 143 hours. At the end of this period the tetracyclines are isolated and found to consist solely of 2-acetyl-2-decarboxamidotetracycline.

The following examples are provided for illustrative purposes and should not be construed as limiting the invention, many variations of which are possible without departing from the spirit or scope thereof. In the production of the new antibiotics, the invention embraces not only the specific microorganisms described but mutants thereof as produced by various known means such as X-radiation, ultraviolet radiation and the like.

EXAMPLE I

The following medium was prepared:

| | |
|---|---|
| Corn starch, g./l. | 75 |
| Corn steep liquor | 25 |
| $CaCO_3$ | 7 |
| $(NH_4)_2SO_4$ | 5 |
| $NH_4Cl$ | 1.5 |
| $MgCl_2$ | 2 |
| $FeSO_4$ | 0.04 |
| $MnSO_4$ | 0.04 |
| $ZnSO_4$ | 0.10 |
| $CoCl_2$ | 0.005 |
| Soybean oil, ml. | 10 |
| Silicone oil (Dow-Corning Antifoam A), g./gal. | 1 |

After sterilization the medium was inoculated with a growth of S. aureofaciens ATCC No. 13749 and fermentation was allowed to proceed for 5 days at 26° C., accompanied by agitation and continuous introduction of sterile air beneath the surface at a rate of 2 cubic feet per hour per gallon. The pH dropped from an initial value of 6.3 to about 5.85 during this period. Beginning with the 84th hour, samples of broth were withdrawn, filtered and tested in vitro against B. subtilis and S. aureus, producing inhibition zones 23 to 32 mm. in diameter.

At the conclusion the broth was filtered and the filtrate extracted, without pH adjustment, with 6 one-sixth volumes of methyl isobutyl ketone. A liter of the combined extracts was next concentrated to about 700 ml. and triturated with an equal volume of ether, causing a solid product to precipitate. Four grams of this solid were dissolved in 250 ml. pH 3.5 MacIlvaine buffer for cellulose column partition chromatography.

Whatman ashless chromatographic cellulose powder was slurried with a solution of nitromethane (20), chloroform (10), and pyridine (3) and transferred to a column about 1½ inches in diameter and about 14 inches long. The buffer solution was slowly passed over this column by gravity, followed by additional aqueous buffer. Two liters of aqueous effluent were collected in a series of separate fractions, which were assayed by paper chromatography to select the fractions containing the desired product in substantially homogeneous state. These fractions were combined and concentrated, whereupon 30 mg. of red solid precipitated. A turbidity assay of this solid vs. K. pneumoniae indicated a potency of 13 units per milligram. The product melted at 90–140° C. with decomposition in this state of purification and was observed to be more than half crystalline by examination under the polarizing microscope. Ultraviolet light absorption spectra and paper chromatography studies indicated it to be 2-acetyl-2-decarboxamidotetracycline free base. After further purification by a second cellulose column partition chromatography step the product exhibited infrared absorption maxima at the following frequencies (1% in KBr pellet): 3390, 3260, 2900, 2835, 1755, 1647, 1620, 1608, 1592, 1580, 1500, 1460, 1443, 1397, 1361, 1347, 1303, 1260, 1234, 1220, 1143, 1102, 816, 799 and 738 cm.$^{-1}$. This infrared absorption spectrum is shown in FIG. I.

EXAMPLE II

The S. aureofaciens culture ATCC No. 13,749 was again employed with the same medium. The inoculum was incubated for two days, and then in a 1000 gal. tank for five days at 26° at 12 cu. ft. of sterile air/hr./gal.

A 2478 gal. batch of broth was adjusted from pH 6.2 (the terminal pH of the fermentation) to 2.0 with 32% hydrochloric acid. The acidified broth was filtered on an Oliver rotary filter. The filtrate was extracted with one-fourth its volume of butanol in a podbielniak countercurrent extractor. The acid butanol extract was concentrated at reduced pressure to 9½ gal., maintaining a temperature of 30–40°.

The butanol concentrate was extracted thoroughly with 1 N hydrochloric acid (8×3 gal.). The combined extracts were treated with activated charcoal (Darco), then the pH was raised to 7.0 with triethylamine. The first crop of crude cake which precipitated weighed 1548 g. (bioassay=22 tetracycline units/mg.).

A 1000 g. sample of the crude antibiotic admixture was mixed with 8000 ml. of water and the pH adjusted to 1.0 with sulfuric acid. By filtration 330 g. of insoluble material were removed and discarded. The filtrate was treated with 200 g. of activated charcoal (Darco), then the pH adjusted to 2.5–3.0 with 20% sodium hydroxide solution. The 137 g. of black tar which separated were removed by filtration and discarded. The filtrate was extracted seven times with a total of 18 l. of butanol. In concentration of the butanol extract to 4 l., 328 g. of solid separated and were collected by filtration. Further concentration to 100 ml. yielded 133 g. of a second crop. The combined 461 g. of wet crude weighed 370 g. after complete removal of solvent. This 370 g. sample was dissolved in 3 l. of methanol and the pH adjusted to 1.8 with sulfuric acid. The solution was treated first with 250 g. of Darco then with 25 g. of Perma-Clear (sodium ethylenediaminetetraacetate). The latter was added intermittently with enough sulfuric acid to maintain the pH at 2. Both the charcoal and the Perma-Clear were discarded. The filtrate was adjusted to pH 5.8 by addition of 20% sodium hydroxide, the solution concentrated to 1 l., 1 l. of isopropyl alcohol and 500 ml. of water added, and the solvent mixture concentrated at 10 mm. (less than 35° C.) to cloudiness. (If necessary, the mixture can be seeded at this point to induce crystallization, concentrated further, under the same conditions, then cooled to 5° and filtered.) In this way, 166 g. of clean crystalline antibiotic base monohydrate, M.P. 160–180° C., were isolated. Further concentration of the filtrate yielded a second fraction, wt. 34 g., and a third fraction, wt. 4 g., both also melting at 160–180°. Reworking of side-streams and charcoal yielded an additional 53 g. of crude material, M.P. 160–180°.

Recrystallization was accomplished by dissolving 100 g. of the first crop in 500 ml. of methanol, then adding 250 ml. of isopropyl alcohol and 100 ml. of water. The pH was adjusted to 5.9. The solution was concentrated at 10 mm. (<35°) until cloudiness developed, then seeded and concentrated further to give 86 g. of yellow crystalline monohydrate of 2-acetyl-2-decarboxamidotetracycline free base. After pumping for 14 hours at 60° (0.1 mm.) this sample, M.P. 179–186°, was analyzed:

*Analysis.*—Calcd. for $C_{23}H_{25}NO_8 \cdot H_2O$: C, 59.86; H, 5.90; N, 3.04. Found: C, 59.61; H, 6.30; N, 3.08.

By pumping at $2 \times 10^{-5}$ mm. over double liquid nitrogen traps for 24 hours at 80–85° complete desiccation was effected. The melting point of the anhydrous material was 179–181°. Bioassay of this material was 76 tetracycline units/mg. vs. *K. pneumoniae*.

*Analysis.*—Calcd. for $C_{23}H_{25}NO_8$: C, 62.29; H, 5.68; N, 3.16. Found: C, 61.86; H, 5.78; N, 3.12.

$[\alpha]_D^{25}$ —125° C. (1 in methanol 0.5 N in hydrochloric acid).

A second crop of 11.2 g., M.P. 176–185°, was collected.

Other analyses obtained for this antibiotic as the monohydrate: C—$CH_3$ 7.08; acetyl 7.86 (acid hydrolysis), 3.99 (alkaline hydrolysis).

A 500 mg. sample of the antibiotic base monohydrate, before recrystallization, was dissolved in the minimum quantity of a solvent mixture consisting of (by volume) ethyl acetate 10 parts: butanol 1 part, saturated with water adjusted to pH 3 with hydrochloric acid. The solution was charged to a powdered cellulose column 2.7 cm. x 36.0 cm. impregnated with the same solvent system, which was also used for development. Fractions 2–25 (of 50) were combined and the solvent removed, to give 78.6 mg. of 2-acetyl-2-decarboxamido-7-chlortetracycline in the form of a yellow, amorphous solid. Crystallization was accomplished in a mixture of methanol-isopropanol-0.1 N hydrochloric acid. The crystalline hydrochloride provided the ultraviolet absorption data tabulated hereinbefore.

The solvent system ethyl acetate 40: nitromethane 25: chloroform 7 saturated with water separated 2-acetyl-2-decarboxamidotetracycline and 2-acetyl-2-decarboxamido-7-chlortetracycline of cellulose columns even more efficiently than the system described above. A 9.8 x 105 mm. column was packed with 2 kg. cellulose powder in this solvent system. Crude crystalline 2-acetyl-2-decarboxamidotetracycline, 10 g., was dissolved in 50 ml. of the same solvent with the addition of 5 ml. methanol and 2 drops conc. HCl, passed over the column, and developed with the same system. Effluent fractions, each approximately 85 ml. in volume, were collected every 30 minutes and assayed by paper chromatography. Effluent fractions 34–169 were found richest in 2-acetyl-2-decarboxamido-7-chlortetracycline. These were diluted with water and lyophilized, providing 2.41 g. of the chloro compound.

Further purification was achieved by crystallization of this product as a sulfosalicylate. 100 mg. of the 2-acetyl-2-decarboxamido-7-chlortetracycline obtained as described in the preceding paragraph was dissolved in 3 ml. methanol 0.01 N with respect to HCl. To this was added 17 mg. sulfosalicylic acid and the solution was stored overnight in a refrigerator. About 3 mg. of residue were filtered off and the filtrate treated with 2 ml. water. A light yellow precipitate formed, which redissolved upon gentle warming. The clear solution was cooled and the product crystallized. The first crop amounted to 31 mg. of monosulfosalicylate containing one mole of methanol of crystallization. Elemental analysis: Calculated for $C_{30}H_{30}O_{14}NSCl \cdot CH_3OH$: C, 51.13; H, 4.71%; found: C, 50.93; H, 5.22 (uncorrected). The infrared absorption spectrum of this salt (1% in dioxane) contains a peak at $5.96\mu$, attributed to the carbonyl group of the 2-acetyl side-chain. This spectrum is illustrated in Figure II. When the spectrum is determined in a potassium bromide pellet this peak occurs at $5.90\mu$. It is absent from the spectra of tetracyclines with the 2-carboxamido function. The sulfosalicylate salt exhibited an activity of 200 tetracycline units per mg. vs. *K. pneumoniae*.

2-acetyl-2-decarboxamidotetracycline was converted to the anhydro derivative in the following manner: 2 g. of the monohydrate was dissolved in 5% hydrochloric acid, the solution heated at 50° for 30 mins. and allowed to cool. A dark oil separated, and, after decanting the supernatant solution, it was dissolved in butanol. Removal of the solvent at reduced pressure left a gum, which formed an amorphous solid when triturated with isopropyl alcohol. This was filtered and washed with ethyl ether. Alternatively 2 g. of the monohydrate was dissolved in 20 ml. of anhydrous hydrogen fluoride, and the solvent allowed to evaporate in a good hood, leaving a dark solid. Purification of the crude degradation product was achieved by cellulose column chromatography with a solvent system composed of a water-saturated mixture of (by volume) 1 part chloroform: 3 parts benzene. A 120 mg. sample dissolved in 20 ml. of this solvent system was charged into a column 3.8 cm. x 13 cm. packed with cellulose impregnated with the same solvent mixture. Development and removal of solvent yielded 104 mg. of crystalline product. Recrystallization from boiling isopropyl alcohol followed by pumping at 54° (0.1 mm.) for 18 hours gave apricot-colored needles, M.P. 204–205° (dec.), of 2-acetyl-4-dimethylamino-4a,12a-dihydro-3,10,11,12a-tetrahydroxy-6-methyl-1,12-(4H,5H)-naphthacenedione.

*Analysis.*—Calcd. for $C_{23}H_{23}O_7N$: C, 64.92; H, 5.45; N, 3.29. Found: C, 64.79; H, 5.55; N, 3.38.

Acetyl 12.03 (acid hydrolysis). Ultraviolet absorption peaks were located at (in methanol 0.01 N in hydrochloric acid): 223 m$\mu$ ($\epsilon$31,450), 273.5 m$\mu$ ($\epsilon$52,650), inflection at 310 m$\mu$ ($\epsilon$6,590), inflection at 323 m$\mu$ ($\epsilon$2,591), 427.5 m$\mu$ ($\epsilon$9,140); (in methanol 0.01 N in sodium hydroxide): 227 m$\mu$ ($\epsilon$25,500), 271.5 m$\mu$ ($\epsilon$43,620), 322.5sm$\mu$ ($\epsilon$6,540), 334sm$\mu$ ($\epsilon$6,130), and 433 m$\mu$ ($\epsilon$12,750). The anhydro compound also showed a strong carbonyl infrared absorption peak at $5.94\mu$ indioxane.

2-acetyl-2-decarboxamido-7-chlortetracycline and 2-acetyl-2- decarboxamidotetracycline, being amphoteric, form salts with both acids and bases. For example, the antibiotics form salts with both organic and inorganic acids, such as phosphoric, nitric, sulfuric, hydrochloric, tartaric, glycollic, citric, gluconic, malic, maleic, succinic, glutaric, acetic, sulfosalicylic and benzoic acids, as well as with bases such as alkali metal and alkaline earth metal hydroxides. The salts of these antibiotics possess antimicrobial activity. They may be prepared by standard procedures well known in the art, such as reacting an equivalent amount of the antibiotic and acid or base in a lower alkanol followed by addition of a non-solvent. After standing, the crystalline salt separates. The sodium salts of both antibiotics are prepared by treating the amphoteric base with sodium hydroxide in water until the pH is over 10. The solution is then frozen and dried under vacuum to yield the dry sodium salt in the form of a water-soluble powder. The calcium salts are prepared employing the same procedure, with calcium hydroxide in place of sodium hydroxide.

What is claimed is:
1. A compound selected from the group consisting of 2-acetyl-2-decarboxamidotetracycline, 2-acetyl-2-decarboxamido-7-chlortetracycline, and the acid and basic salts of said substances.
2. 2-acetyl-2-decarboxamidotetracycline.
3. The hydrochloride salt of the product of claim 2.
4. The sodium salt of the product of claim 2.
5. 2-acetyl-2-decarboxamido-7-chloretetracycline.
6. The hydrochloride salt of the product of claim 5.
7. The sodium salt of the product of claim 5.
8. A process for co-producing 2-acetyl-2-decarboxamidotetracycline and 2-acetyl-2-decarboxamido-7-chlortetracycline which comprises cultivating the microorganism S. aureofaciens, ATCC 13749, in an aqueous nutrient medium containing carbonhydrate, nitrogen and inorganic salts, under submerged aerobic conditions, until substantial antimicrobial activity is imparted to said medium.
9. A process as in claim 8 in which the antibiotics are recovered from the fermentation broth and separated by cellulose column chromatography.

References Cited by the Examiner
UNITED STATES PATENTS

| | | | |
|---|---|---|---|
| 2,971,007 | 2/1961 | Cheney et al. | 260—559 |
| 2,976,318 | 3/1961 | Blackwood | 260—559 |
| 2,997,471 | 8/1961 | Cheney et al. | 260—559 |
| 3,022,347 | 2/1962 | Tanner et al. | 260—559 |

OTHER REFERENCES

Hochstein et al.: "J. Am. Chem. Soc.," vol. 82, pages 5934–7 (1960).

NICHOLAS S. RIZZO, *Primary Examiner.*

IRVING MARCUS, *Examiner.*